United States Patent [19]

Shrock et al.

[11] Patent Number: 6,018,777

[45] Date of Patent: *Jan. 25, 2000

[54] INTELLIGENT SCSI-2/DMA PROCESSOR

[75] Inventors: Eugene L. Shrock; Peter J. Bartlett, both of Colorado Springs, Colo.

[73] Assignee: Hyundai Electronics America, San Jose, Calif.

[*] Notice: This patent is subject to a terminal disclaimer.

[21] Appl. No.: 08/976,683

[22] Filed: Nov. 24, 1997

Related U.S. Application Data

[63] Continuation of application No. 07/867,951, Apr. 13, 1992, Pat. No. 5,721,954.

[51] Int. Cl.$^7$ ............................................ G06F 13/28
[52] U.S. Cl. ............................ 710/24; 710/127; 711/156
[58] Field of Search ........................... 710/127, 24, 25, 710/34, 22, 23, 26, 27, 28, 128, 129, 130; 711/156

[56] References Cited

U.S. PATENT DOCUMENTS

| | | | |
|---|---|---|---|
| 4,204,634 | 5/1980 | Barsuhn et al. | 371/38 |
| 4,451,884 | 5/1984 | Heath et al. | 710/24 |
| 4,631,671 | 12/1986 | Kawashita et al. | 364/200 |
| 4,667,305 | 5/1987 | Dill et al. | 395/307 |
| 4,683,534 | 7/1987 | Tietjen et al. | 395/307 |
| 4,716,525 | 12/1987 | Gilanyi et al. | 395/250 |
| 4,809,166 | 2/1989 | Cooper | 364/200 |
| 4,843,544 | 6/1989 | DuLac et al. | 364/200 |
| 4,864,532 | 9/1989 | Reeve et al. | 395/250 |
| 4,864,601 | 9/1989 | Berry | 379/93.07 |
| 4,878,166 | 10/1989 | Johnson et al. | 395/307 |
| 4,965,801 | 10/1990 | DuLac | 371/40.1 |
| 5,031,097 | 7/1991 | Kitakami et al. | 364/200 |
| 5,093,910 | 3/1992 | Tulpule et al. | 395/185.09 |
| 5,164,943 | 11/1992 | Waggoner | 371/3 |
| 5,170,477 | 12/1992 | Potter et al. | 395/411 |
| 5,175,825 | 12/1992 | Starr | 395/325 |
| 5,175,864 | 12/1992 | Tairaku | 395/800 |
| 5,179,667 | 1/1993 | Iyer | 395/275 |
| 5,185,876 | 2/1993 | Nguyen et al. | 395/425 |
| 5,200,864 | 4/1993 | Dunn et al. | 360/48 |
| 5,233,692 | 8/1993 | Gajjar et al. | 395/325 |
| 5,251,303 | 10/1993 | Fogg, Jr. et al. | 395/844 |
| 5,257,391 | 10/1993 | DuLac et al. | 395/800 |
| 5,276,807 | 1/1994 | Kodama et al. | 395/200 |
| 5,283,872 | 2/1994 | Ohnishi | 395/325 |
| 5,297,242 | 3/1994 | Miki | 395/307 |
| 5,357,622 | 10/1994 | Parks et al. | 395/425 |
| 5,388,227 | 2/1995 | McFarland | 395/307 |
| 5,438,665 | 8/1995 | Taniai et al. | 395/845 |
| 5,452,432 | 9/1995 | Macachor | 395/854 |
| 5,471,632 | 11/1995 | Gavin et al. | 395/284 |

OTHER PUBLICATIONS

NCR Corporation "NCR 53C720 SCSI I/O Processor—Programmer's Guide" 1991.

NCR Corporation "NCR 53C720 SCSI I/O Processor—Data Manual" 1991.

Hurlbut et al., "Odd Byte Data Alignment Mechanism for System I/O". IBM Technical Disclosure Bulletin, vol. 24 No. 11B. Apr. 1982, pp. 5948–5950.

*Primary Examiner*—Hiep T Nguyen
*Attorney, Agent, or Firm*—Townsend and Townsend and Crew LLP

[57] ABSTRACT

A SCSI-2-and-DMA processor that has on a single integrated circuit a SCSI-2 interface for a SCSI-2 data bus that is at least two bytes wide and a DMA interface for a system data bus that is at least two bytes wide. This integrated circuit has an set of control registers and an on-chip processor such that the transfers involving SCSI-2 data transfers involving data words that have a width of at least two bytes can be processed and completed without burdening the remainder of the system. Substantially all that is needed of the system processor is to down load a very compact control program and then transfers between this integrated circuit and system RAM. The on-chip processor allows chaining of random length blocks of contiguous address data by using a chain mode of transfer which also pairs up any odd residue with a portion of the first word of the next block in the chain using on-chip processing.

11 Claims, 4 Drawing Sheets

INTELLIGENT SCSI-2/DMA PROCESSOR

CROSS REFERENCE TO RELATED APPLICATION(S)

This is a continuation of application Ser. No. 07/867,951 filed on Apr. 13, 1992 now U.S. Pat. No. 5,721,954.

BACKGROUND OF THE INVENTION

The present invention relates to a process and apparatus for communicating data over a high speed parallel bus, and more particularly to a process and apparatus for communicating a random number of bytes (1 byte=8 bits) over a SCSI compatible data bus that is at least two bytes wide and operating under a proposed update of the SCSI standard.

The Small Computer System Interface (SCSI), as defined by ANSI X3.131 issued in 1986, has found wide acceptance in the computer industry. The ANSI standard defines a high speed parallel bus and the interconnections to the bus. This high speed parallel bus has a data portion and a control portion. As defined in the ANSI standard, the SCSI bus transfers parallel data words that are one byte wide. Each data byte transferred by the data portion has an associated parity bit that is transferred with it on a line of a control portion.

A very popular use of the SCSI standard by industry has been in peripherals, such as the SCSI disk controller described in U.S. Pat. No. 4,965,801 "ARCHITECTURAL ARRANGEMENT FOR A SCSI DISK CONTROLLER INTEGRATED CIRCUIT", by Keith DuLac and assigned to the assignee of the present invention. But this disk controller has only a one byte wide SCSI bus to transfer data, so its data bandwidth is not as high as it could be if it had a wider parallel data bus.

The SCSI bus and interconnect has been so well received by the computer industry that there is strong interest in the industry to update the SCSI standard to allow it to grow as computer systems have grown, and yet maintain compatibility with existing one byte SCSI equipment. To allow the SCSI bus and interconnect to grow, it has been proposed that SCSI be permitted to transfer one or more bytes at a time. This would allow SCSI bus systems keep up with advances to 32 and 64 bit processors and large (>100 Megabytes) disk systems, and maintain compatibility with existing equipment.

An updated SCSI standard, proposed ANSI X3T9.2/86-109, Revision 10h dated Oct. 17, 1991, is nearing adoption by ANSI. This proposed update, referred to as SCSI-2, provides for one byte, two byte and four byte parallel words to be transferred across the SCSI data bus. SCSI-2 is so near completion that some computer systems using SCSI-2 two byte and four byte wide data buses are already being developed. Each byte of the data word has a respective parity bit associated with it that is transferred on a respective control line at the same time that its respective data byte is transferred.

Having a parallel data bus that is two bytes or four bytes wide presents some problems for a computer system that did not occur on the original one byte SCSI bus. For example, how does the computer system handle block transfers of an odd number of bytes across a SCSI-2 bus? How does the computer system handle two blocks of contiguous address data that are transferred across a SCSI-2 bus where both blocks have an odd number of bytes? Or, how does a computer system that is receiving data words that are oriented on odd addresses as word boundaries instead of even word boundaries re-orient data words that are transmitted with even address orientations?

A computer system using a SCSI-2 chip similar in architecture to the one described in U.S. Pat. No. 4,965,801 mentioned above but enlarged to electrically connect to a multiple byte data bus would be heavily burdened by a stream of instructions from system. processor to the SCSI chip that would be required to handle the possibilities that multiple byte word transfer creates. Not only would the system processor be burdened by the data instructions and manipulations required by some common multiple byte transfers over a SCSI-2 bus, but the system bus and the system direct memory access controller (DMA) would be burdened also.

It is an object of this invention to provide an integrated circuit SCSI-2 processor that combines a SCSI-2 interface protocol and data handling capability and a DMA interface protocol and data handling capability between a SCSI-2 bus and a system memory.

It is another object of the invention to provide a SCSI-2 processor that performs block transfers of an odd number of bytes without burdening a system processor with the task.

It is another object of the invention to provide a SCSI-2 processor that can perform scatter-gather memory operations without burdening a system processor with the task.

SUMMARY OF THE INVENTION

Briefly stated, in accordance with one aspect of the invention the foregoing objects are achieved by providing a high speed parallel input/output processor integrated circuit for use in a computer system. The input/output processor integrated circuit includes a device for connecting to a SCSI-2 bus having at least 16 data lines, another device for connecting to a system memory bus having a plurality of memory data lines, and a device for directly accessing system memory and transferring data received from the SCSI-2 bus to the system memory. The input/output processor integrated circuit performs this transfer under its own control without burdening the remainder of said computer system.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 1:
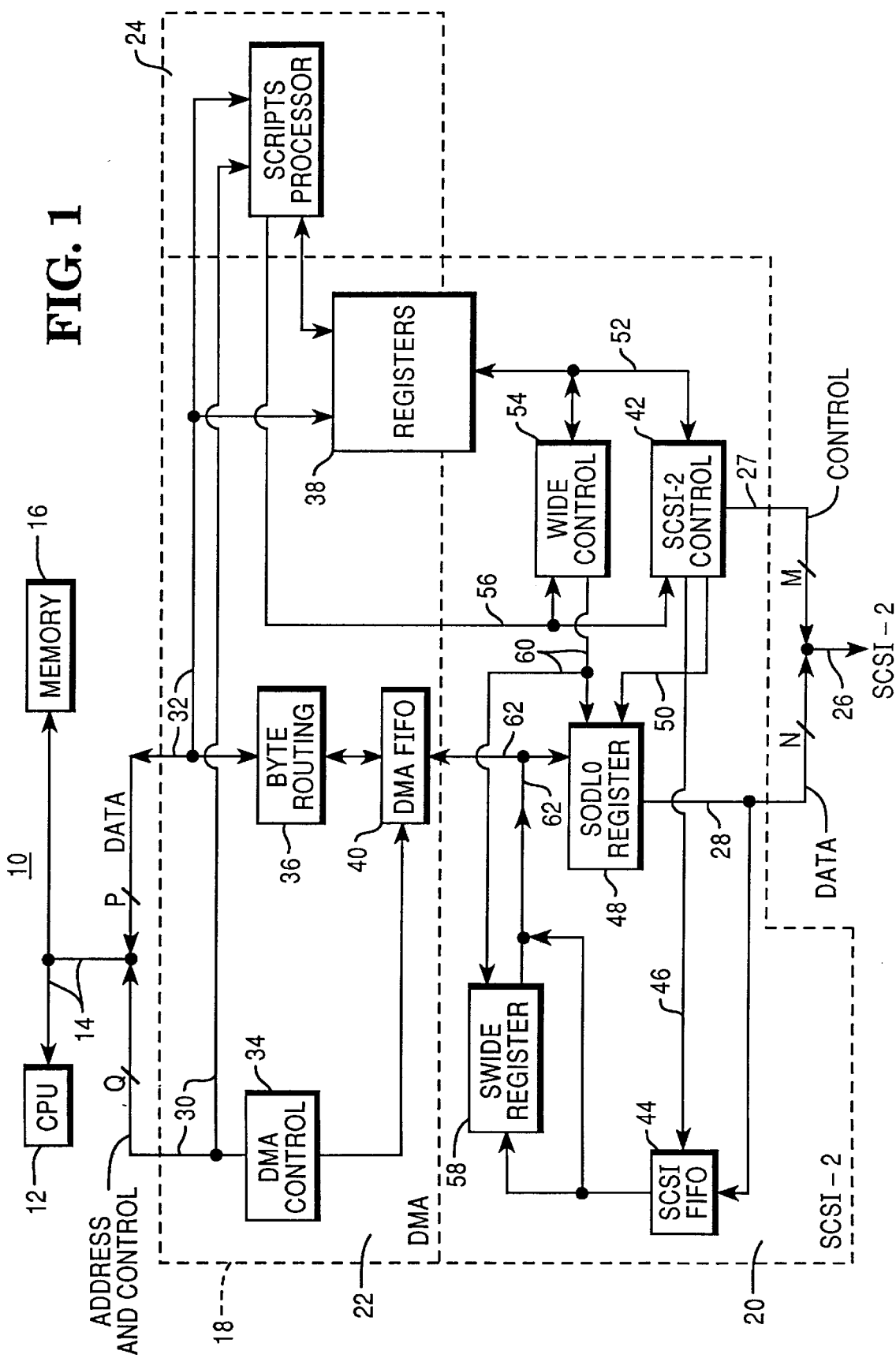
FIG. 1 is a block diagram of a computer system with an intelligent input/output integrated circuit that has a SCSI-2 portion and a DMA portion thereon, according to the present invention.

Referring now to FIG. 1, a computer system 10 is shown in block diagram form. Computer system 10 has a processor (CPU) 12 that is connected to a system bus 14. Computer system 10 also has a memory 16 that is connected to system bus 14. Memory 16 typically contains both read only memory (ROM or PROM) and random access memory (RAM) for storing instruction and information data bits. Additionally, a SCSI I/O processor 18 is connected to system bus 14 to provide input/output transfers.

System bus 14 has an address and control portion having Q lines therein, and a data portion that has P lines therein. P is an integral multiple of 8 so that data is transferred over system bus 14 in words of one or more bytes. Parity bits are considered to be control bits and thus parity lines are part of the Q address and control lines.

SCSI-2 input/output processor 18 has three portions that cooperate one with another to provide system input/output operations. These three portions are a SCSI-2 portion 20, a DMA portion 22 and a scripts processor 24. One embodiment of the present invention is type NCR 53C720 available from NCR Corporation, Dayton, Ohio. The type NCR 53C720 is described in *NCR 53C720 SCSI I/O Processor Programmer's Guide* and *NCR 53C720 SCSI I/O Processor Data Manual*, both published in 1991 by Microelectronic Products Division of NCR Corporation, which are hereby incorporated by reference.

SCSI-2 portion 20 connects to a SCSI-2 bus that conforms to the proposed ANSI standard X3T9.2/86-109 Revision 10h. SCSI-2 bus 26 has a control bus 27 with M control lines and a data bus 28 with N data lines. For the preferred embodiment, N is equal to 16, but those skilled in the art will recognize that the modifications to connect to a SCSI-2 having 32 data lines are straightforward and, thus, deemed to be within the scope of the current invention.

Having a data bus that is two bytes wide presents some problems that were not possible with the original SCSI bus whose data bus was only one byte wide. For example, how does the processor 18 handle block transfers of an odd number of bytes? How does it handle two blocks of contiguous address data that both have an odd number of bytes? or, how does the processor 18 handle data being transferred with a memory that has its words oriented on odd addresses as word boundaries instead of even word boundaries?

The SCSI-2 I/O processor 18 of the present invention is intelligent enough to handle all of these possibilities itself. This intelligence is provided by scripts processor 24 and controlling software. The controlling software is written in a high level scripts language. This language is compact and thus each control program does not occupy much memory storage space. The individual control programs are stored in system memory 16 in ROM or RAM depending upon the needs of the computer system 10. Each control program is down loaded from system memory 16 to scripts processor 24 via system bus 14 and on-chip address-and-control bus 30 and data bus 32. Because the scripts language is compact, the down loading takes very little system bus bandwidth. The down loaded control program is stored in on-chip memory and is executed by scripts processor 24.

Each control program performs all of the tasks required to perform SCSI-2 multiple byte word transfers with system memory and also performs all of the data byte manipulation required in a manner that is transparent to the user. Since almost all of the operations of SCSI I/O processor 18 are controlled by on-chip hardware and on-chip, down loaded software, computer system 10 is not burdened by its operation; instead, overall system performance is greatly enhanced by this third generation, single chip SCSI I/O processor 18.

DMA portion 22 of SCSI I/O processor 18 connects to system bus 14 in two portions. The address and control portion of the system bus 14 is connected to an internal DMA address and control bus having Q lines therein. Internal DMA address and control bus 30 is connected to a DMA control unit 34 and to scripts processor 24. The data portion of system bus 14 is connected to an internal DMA data bus 32. Internal DMA data bus 32 is connected to a byte routing unit 36, a set of control registers 38 and scripts processor 24. DMA control unit 34 along with byte routing unit 36 control a flow of data through DMA FIFO 40 during high speed data transfers to or from system bus 14. The control registers 38 hold flags that control operation of scripts processor 24. These flag may be written to by CPU 12 and by scripts processor 24 to perform the operations necessary for SCSI-2 to DMA transfers and DMA to SCSI-2 transfers. Scripts processor 24 with the assistance of the flags in register set 38 and other registers that will be described below perform the difficult tasks such as odd address orientation of data, odd byte SCSI-2 data block transfers, and scatter-gather operations.

SCSI-2 portion 20, as mentioned before, connects to two portions of SCSI-2 bus 26. An internal SCSI-2 data bus 28 connects to the N data lines of SCSI-2 bus 26, and an internal SCSI-2 control bus 27 connects to the M control lines of SCSI-2 bus 26. SCSI-2 control bus 27 connects to SCSI-2 control unit 42. SCSI-2 control unit 42 provides most of the control functions for the SCSI-2 protocol and error detection. SCSI-2 control unit 42 is connected to SCSI-2 FIFO 44 via bus 46 and to SCSI-2 Output Data Latch (SODL0) 48 by bus 50. SCSI-2 control unit 42 also is connected by bus 52 to register set 38 in order to receive and update control signals stored therein. These registers are described completely in NCR 53C720 SCSI I/O Processor Data Manual and NCR 53C720 SCSI I/O Processor Programmer's Guide and will not be repeated here.

In addition to SCSI-2 control unit 42, bus.52 also connects wide control unit 54 to the register set 38. Wide control unit 54 provides control for multiple byte transfers on SCSI-2 bus 26. Both wide control unit 54 and SCSI-2 control unit 42 are connected to scripts processor 24 by bus 56 in order to receive control signals to control the process of transferring multiple byte wide SCSI-2 data words. Wide control unit 54 connects to SODL0 register 48 and SWIDE register 58 by bus 60. As will be described, registers 48 and 58 handle the special tasks of SCSI-2 transfers using multiple byte data words.

In Operation

For single byte word transfers, there are basically two type of operations: receive and send. In a receive operation, eight bit data words are received from SCSI-2 bus 26 (in eight bit mode) and are conducted via bus 28 to SCSI-2 FIFO 44. SCSI-2 FIFO provides some buffering for the received data words and then transfers these words via bus 62 to DMA FIFO 40. DMA FIFO 40 and byte routing unit 36 provide further buffering and re-organize the data into longer words, such as 32 bit words or 64 bit words, to be transferred over system bus 14. In this manner the eight bit SCSI data words are reorganized into 32 or 64 bit system data bus words for storage in memory 16.

For a send eight bit words transfer operation, multiple byte words are conducted via system bus 14 to internal DMA data bus 32 and to byte routing unit 36. Byte routing unit 36 and FIFO 40 organize the data to be sent into eight bit words that are conducted via bus 62 to SODL0 register 48. SODL0 register is at least sixteen bits wide, for type NCR 53C720 this register is sixteen bits wide, and the single byte words being sent occupy the lowest eight bit position in SODL0 register 48. In such a case, the higher order bits are irrelevant. The data words are parallel shifted out of the SODL0 register 48 onto the lowest eight bit positions of internal bus 28 and of SCSI-2 bus 26.

Generally sending and receiving SCSI-2 multiple byte words, i.e. words at least two bytes in width, is the same as sending and receiving single byte words, except that block transfers of an odd number of bytes requires special processing. This special processing is provided by scripts processor 24, register set 38, SWIDE register 58, SODL0 register 48, wide control unit 54 and SCSI-2 control unit 42 working together.

Figure 2:
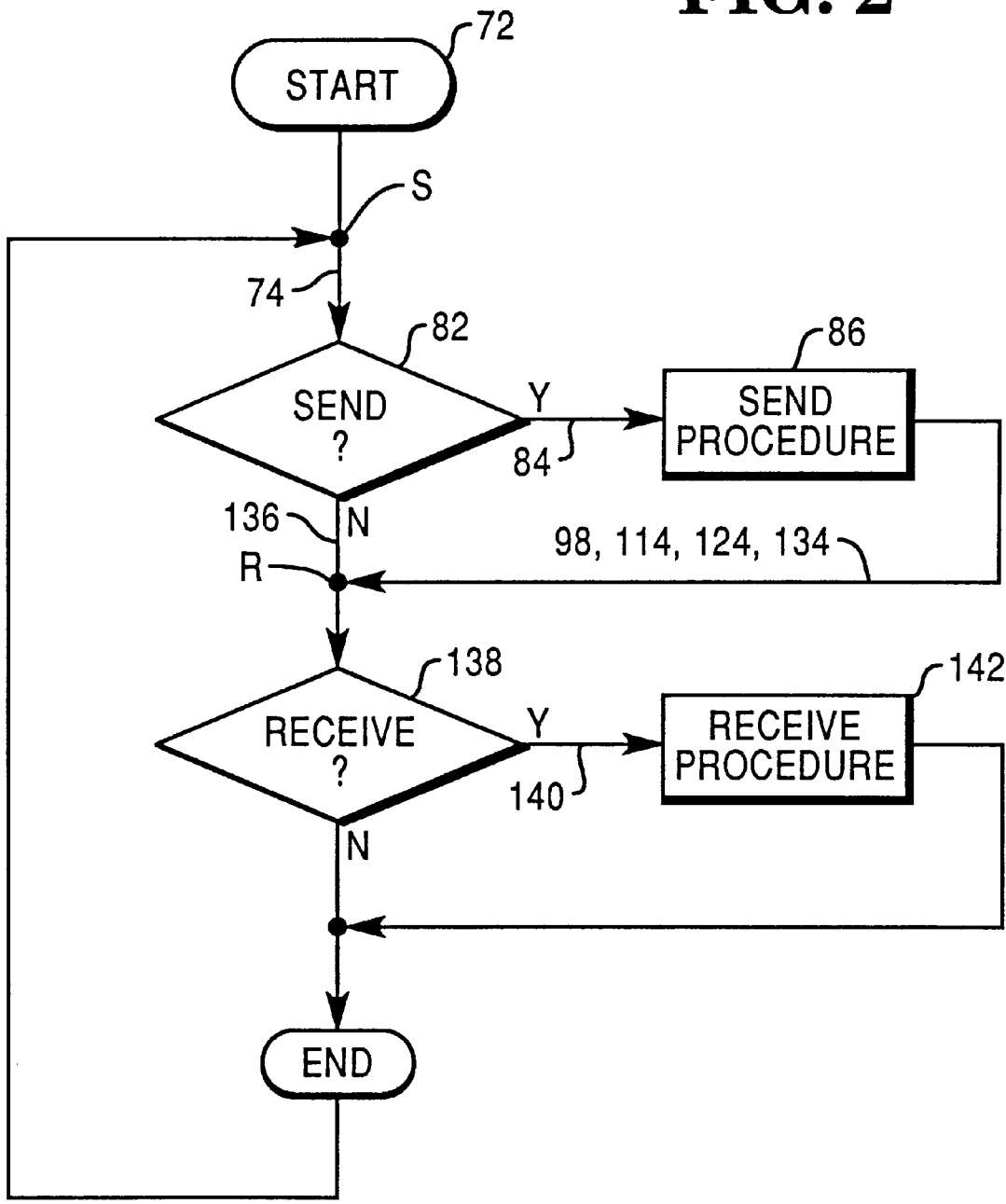
FIG. 2 is a simplified flow diagram of a SCSI-2 transfer process according to the present invention.

Referring now to FIGS. 1 and 2 the process of transferring multiple byte words using SCSI-2 I/O processor 18 during a data transfer between SCSI-2 bus 26 and system bus 14 will be described according to one embodiment of the invention.

I/O Process 70 begins with the start operation 72. Start operation 72 loads a control program for the process 70 from system memory 16 to I/O SCSI processor 18. A pseudocode listing for the I/O Process 70 is included in Appendix A of this specification. Other listings are presented in the NCR 53C720 *SCSI I/O Processor Programmer's Guide*, mentioned above.

Once the control program is loaded into the SCSI I/O Processor 18 during start operation 70, scripts processor 24, process 70 follows path 74 to a decision 82. At decision 82, a determination is made if a send SCSI data request has occurred. If a send SCSI data request has occurred, the process 70 follows path 84 to send procedure 86. This procedure is shown in detail in FIG. 3.

Figure 3:
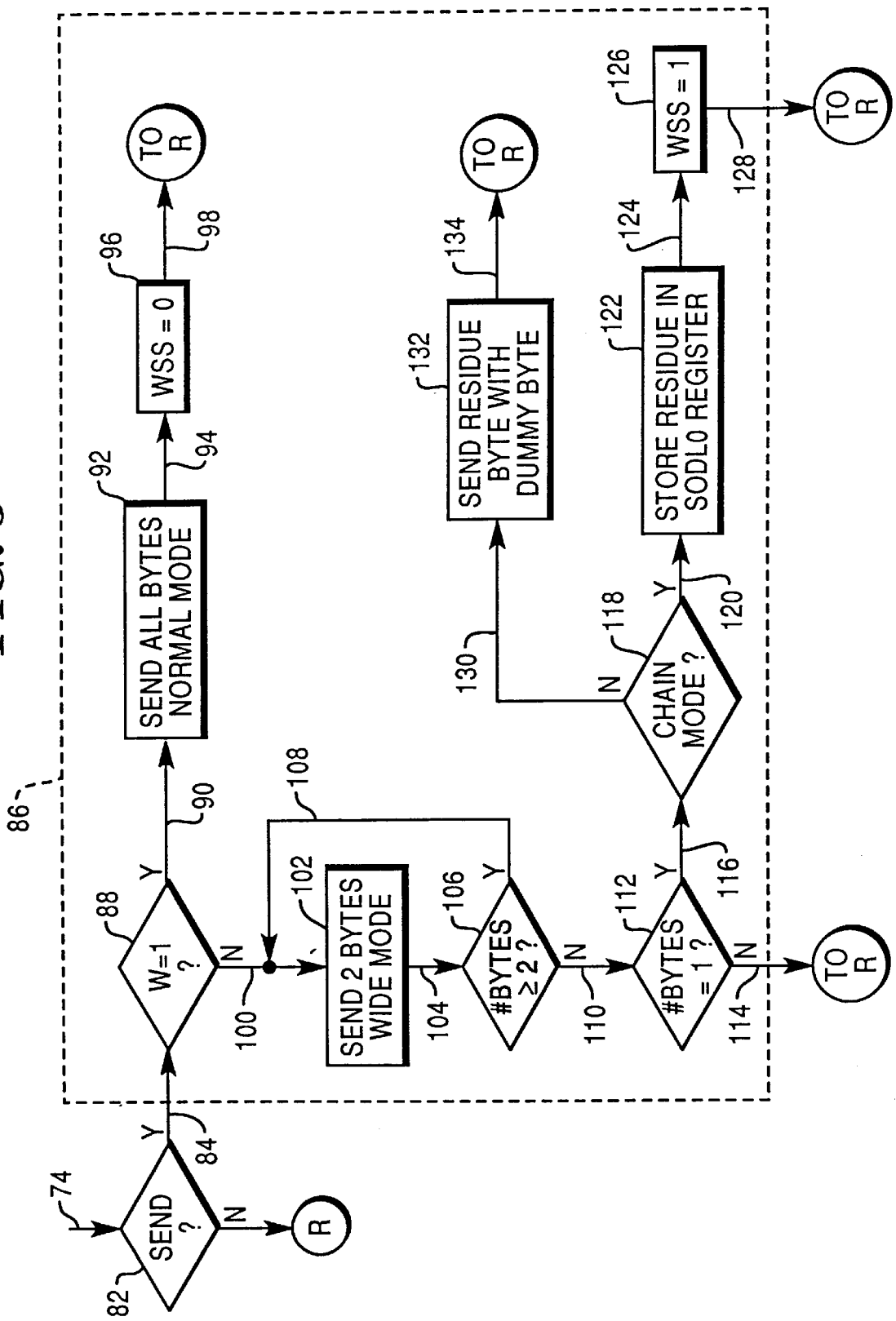
FIG. 3 is a flow diagram of a send portion of a SCSI-2 transfer process of FIG. 2.

Referring now to FIG. 3, send procedure 86 is entered by path 84 with a determination that a send request has been made and leads to a decision 88 where a determination is made if the length of the data word sent is one byte or not. In type NCR 53C720, this determination is made by examining register SCNTL2 bit 3 which is the wide SCSI send flag. If the length of the data word to be sent is one byte, then procedure 86 follows path 90 to operation 92, which basically instructs the SCSI-2 portion 20 that the current transfer is for one byte wide words. Since, as mentioned above, one byte wide words are much simpler to transfer, SCSI-2 control unit 42 performs this simple transfer procedure and transfers all of the bytes to be sent. At the completion of the operation 92, the procedure 86 follows path 94 to the operation 96 which resets the wide SCSI send flag in the register set 38. After this flag is reset, the procedure 86 follows path 98 to node R.

If the determination at decision 88 is that the word length of the data to be sent is not one byte, then the procedure 86 follows path 100 to operation 102 where a two byte word length is determined since with the preferred embodiment those are the only two possibilities. For an embodiment that has a 32 bit wide data word and SCSI-2 data bus, a W=2 test would be added to separate the two byte word send from the four byte word send situation. After operation 102, procedure 86 follows path 104 to a decision 106 where a determination is made if the number of bytes awaiting transfer is equal to or greater than the wide of the SCSI-2 data bus 26, in this case two. If the number of bytes awaiting transfer is greater than or equal to the width of the SCSI-2 multiple byte data word, then the procedure 86 follows path 108 to path 100 where operation 102 and decision are repeated until the number of bytes remaining to be transferred is less than a full SCSI-2 multiple byte data word. At this time, procedure 86 follows path 110 to a decision 112. At decision 112, one of the set of registers 38 is examined to see if there are residual bytes that are less than a full word, i.e. one for a type NCR 53C720, that have not yet been sent. If the answer is negative, that means that all bytes of the transfer have been sent and the procedure 86 follows path 114 to node R.

If the answer to decision 112 is affirmative, that means that there is at least one untransferred byte that remaining to be sent. In such a case, procedure 86 follows path 116 to decision 118. At decision 118, the procedure determines if a chain mode transfer is in progress. This is determined by examining the chain mode flag bit in SCNTL2 register of the set of registers 38.

Chain mode is a special mode for transferring blocks of data. It is especially useful for so called scatter/gather memory operations where large blocks of data having contiguous addresses are given logical or virtual addresses and then scattered among smaller blocks of real addresses in system memory 16. These smaller blocks will have a random number of contiguous real addresses, so some will have an even number of bytes and some will have an odd number of bytes. The chain mode is able to gather the random sized blocks from system memory into larger blocks that can efficiently transferred over a multiple byte wide SCSI-2 bus. In a similar manner, chain mode is useful in scattering data from the SCSI-2 bus blocks into whatever small blocks of real memory are available, whether capable of storing an even or an odd number of bytes. Thus, the scatter-gather operation would be a heavy burden on CPU 12 or system bus 14 if the SCSI-2 I/O processor 18 did not handle such data manipulations itself.

Besides the scatter-gather operations, chain mode is also used for transfers that exceed the limit set in the proposed SCSI-2 standard for the length of a block transfer.

In chain mode, the SCSI-2 portion 20 knows by the condition of the chain mode flag that a related block transfer will follow the current one, so any residual odd bytes from the current block move may be married with one or more byte of the next block move. In this manner, dead spots and the transfer of irrelevant data are avoided. So if decision 118 affirms that a chain mode transfer is under way, then procedure 86 follows path 120 to operation 122. The operation 122 stores the residue byte or bytes in a register such as SODL0 register 48 shown in FIG. 1. Here the residue waits to be joined with data bytes from the next block of data in the chain of block transfers. After operation 122, the procedure 86 follows path 124 to operation 126 where the wide SCSI send flag is set indicating that a multiple byte word transfer operation is in progress. After this flag is set, the procedure 86 follows path 128 to node R.

If decision 112 indicates that a chain mode transfer is not in progress, procedure 86 follows path 130 to the operation 132. Because there is no chain mode, the residue byte or bytes must be sent as is, so the residue byte or bytes are sent with irrelevant dummy bits for the remainder of the last data word. Even though a data byte is made up of dummy bits, its respective parity bit that is transferred on its respective parity control line is correct for the dummy bits. After operation 132, the procedure 86 follows path 134 to node R. This concludes procedure 86.

Figure 4:
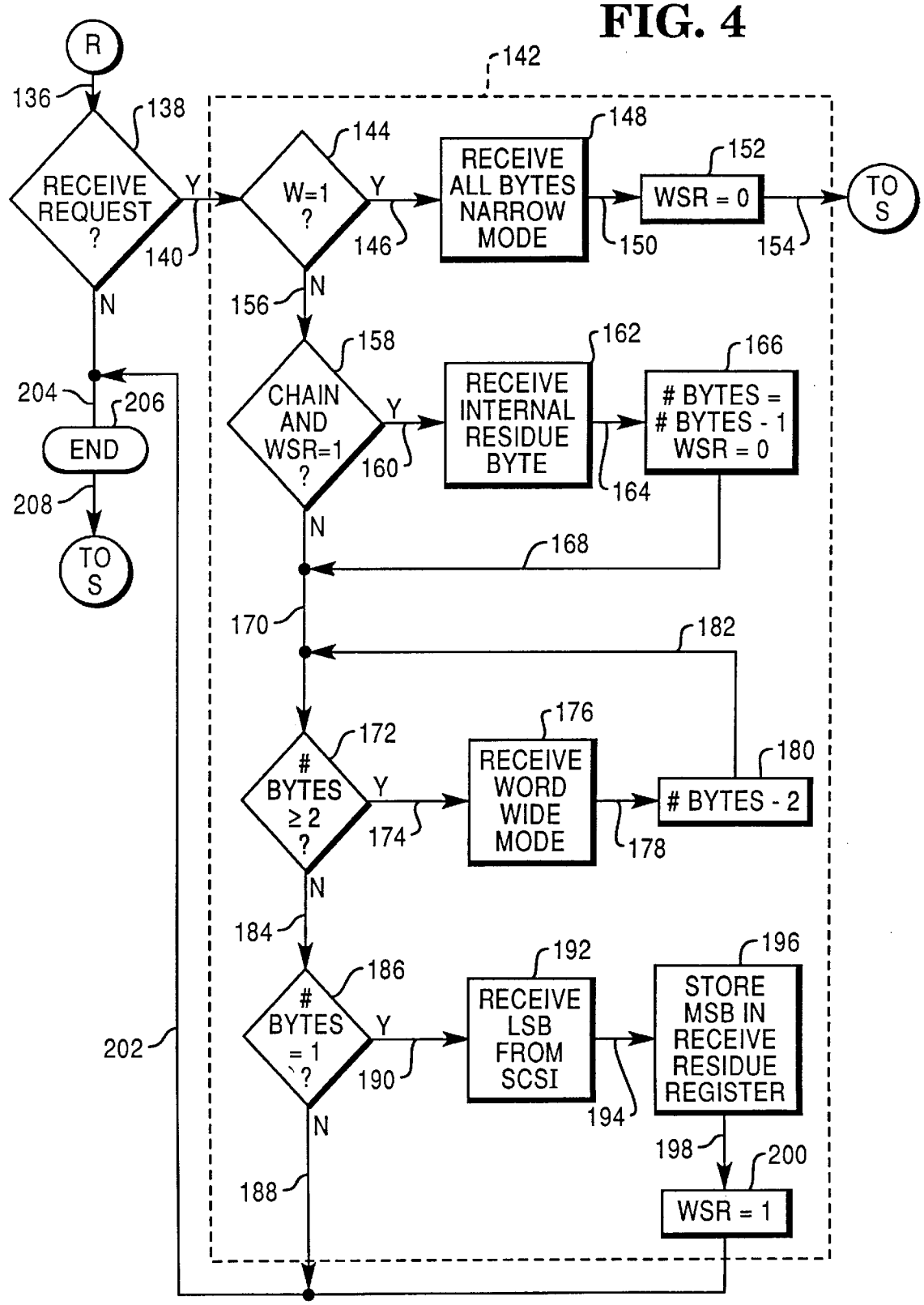
FIG. 4 is a flow diagram of a receive portion of a SCSI-2 transfer process of FIG. 2.

Referring now to FIGS. 2 and 4, if decision 82 is that a SCSI send data transfer is not occurring, then the process 70 follows path 136 through node R to a decision 138 to determine if a SCSI receive data transfer is occurring. If decision 138 determines that a SCSI receive transfer is occurring, process 70 follows path 140 to receive procedure 142 which causes the SCSI-2 portion 20 (shown in FIG. 1) to receive data words from SCSI-2 bus 26.

Path 140 leads to decision where a determination is made if the length of the data word sent is one byte or not. As mentioned above for a type NCR 53C720, this determination is made by examining register SCNTL2 bit 3 which is the wide SCSI send flag. If the length of the data word to be sent is one byte, then procedure 142 follows path 146 to operation 148, which basically instructs the SCSI-2 portion 20 that the current receive transfer is for one byte wide words. Since, as mentioned above, one byte wide words are much simpler to transfer, SCSI-2 control unit 42 performs this simple transfer procedure and transfers all of the bytes to be received. At the completion of the operation 148, the procedure 142 follows path 150 to the operation 152 which resets the wide SCSI send flag in the register set 38. After this flag is reset, the procedure 142 follows path 154 to node S.

If the determination at decision 144 is that the word length of the data to be received is not one byte, then the procedure 142 follows path 156 to a decision 158. At this point a two byte word length is determined since with the preferred embodiment one and two are the only two possibilities. For an embodiment that has a 32 bit wide data word and SCSI-2 data bus, a W=2 decision would be added to separate the two byte word receive from the four byte word receive situation. After a negative result at decision 144, procedure 142 follows path 156 to a decision 158 where a determination is made if a chain mode transfer is occurring and if the receive residue flag is set, then procedure 142 follows path 160 to operation 162. To get to operation 162, the integrated circuit 18 is in chain receive mode and the previous chain mode transfer has left at least one residual byte in SWIDE register 58 (shown in FIG. 1). Operation 162 shifts this residue byte or bytes onto internal bus 62 before the current chain mode block of received data is transferred to bus 62. After operation 162, procedure 142 follows path 164 to operation 166 where the number of untransferred bytes is decremented by one and the receive wide SCSI residue flag is reset. After operation 166 the procedure 142 follows path 168 to 170 where the procedure should have negative results with the next to decisions and go to the end of process 70.

If the result of decision 158 is negative, that means that there is no wide residue to deal with and the current SCSI-2 receive block of data words can be processed and the procedure 142 follows path 170 to decision 172. At decision 172 the number of bytes to be transferred to the into the SCSI-2 portion 20 (shown in FIG. 1) is equal to or greater than the width of the SCSI-2 data bus, i.e. two for a two byte wide SCSI-2 bus. If the number of bytes to be received by SCSI-2 portion 20 is greater than or equal to the width of the SCSI-2 multiple byte data word, then the procedure 142 follows path 174 to operation 176 where one SCSI-2 multiple byte word is received from the SCSI-2 data bus 26. After the operation 176 is completed, the procedure 142 follows path 178 to operation 180 where the number of bytes to be received in the current block is decremented by two since two bytes were received. After operation 180, procedure 142 follows path 182 to path 170 and decision 172. Decision 172 and operations 176 and 180 are repeated until the number of bytes remaining to be received is less than a full SCSI-2 multiple byte data word.

If the result of decision 172 is negative, that means that there is less than a full SCSI-2 multiple byte word to be received, under this condition, procedure 142 follows path 184 to a decision 186. At decision 186, one of the set of registers 38 is examined to see if there are residual bytes that are less than a full word, i.e. one for a type NCR 53C720, that have not yet been received. If the answer is negative, that means that all bytes of the transfer have been received and the procedure 142 follows path 188 to path 202 to end 206.

If the result of decision 186 is affirmative, procedure 142 follows path 190 to operation 192. At operation 192, the low'significant bytes to complete the chain mode block receive transfer are received from SCSI-2 bus 26. After operation 192 is completed, procedure 142 follows path 194 to operation 196. At operation 196, the more significant byte or bytes are stored in a receive residue register and follow path 198 to operation 200. At operation 200, the wide SCSI residue flag is again set for the next receive chain mode block transfer. After operation 200, procedure 142 follows path 202 to path 204 and the end of process 70 at 206.

If CPU 12 does not change the programming of SCSI-2 I/O processor 18, process 70 will follow path 208 and begin process 70 again anew at node S.

Thus, it will now be understood that there has been disclosed a new and novel SCSI I/O processor for use in a computer system and a process for operating this processor. While the invention has been particularly illustrated and described with reference to preferred embodiments thereof, it will be understood by those skilled in the art that various changes in form, details, and applications may be made therein. For example, modifications to provide a process and apparatus to operate with a four byte wide SCSI-2 data bus instead of a two byte wide data bus. It is accordingly intended that the appended claims shall cover all such changes in form, details and applications which do not depart from the true spirit and scope of the invention.

```
// ** Pseudocode algorithm to implement wide SCSI chaining**
//
    // WSR = Number of receive residue bytes, WSR = 0 or 1
    // WSS = Number of send residue bytes, WSS = 0 or 1
        N = Number of bytes in transfer request, N > 0
// WIDTH = Width of transfer request, in bytes, W = 1 or 2
// CHAIN = Chain mode (1=True, 0=False)
WSR = 0; WSS =0;
loop // Forever
    // Wait for transfer request.
    // N, WIDTH, and CHAIN should be stable at that time.
    // WSS and WSR will be as left by last transfer.
    if SCSI_SEND_REQUEST then
        if WIDTH = 1 then
            . . . send all N transfer bytes to SCSI in narrow rnode
            WSS =0;
        else
            if WSS then
                // Send residue byte, if necessary
                . . . join 1 transfer byte (LSB) with residue byte (MSB)
                . . . then send to SCSI as 1 word
                N = N − 1;
                WSS =0;
            end if;
            while N >= 2 do // Send all complete 16-bit words to SCSI
                . . . send a 16-bit word to SCSI
                N = N − 2;
            end while;
            if N = 1 then // Single byte left over?
                if CHAIN then
                    // Byte becomes new residue byte
                    . . .store last transfer byte in send residue register
                    WSS = 1;
                else.
                    . . . internally join last byte (LSB) with "dummy" byte
                    . . . send both bytes to SCSI as one 16-bit word
                end if;
            end if;
        end if;
    else if SCSI_RECEIVE_REQUEST then
    RECEIVE:    // SCSI receive algorithm
        if WIDTH = 1 then
            . . . receive N SCSI bytes in narrow mode
            WSR = 0;
        else
            if CHAIN and WSR then
```

```
    ... receive internal residue byte
    N = N – 1
    WSR = 0;
  end if;
  while N >= 2 do    // Receive all complete 16-bit words from SCSI
    ... receive a 16-bit wprd from SCSI
    N = N – 2;
  end while;
  if N = 1 then
    ... receive LSB only from SCSI
    ... store MSB in receive residue register
    WSR = 1;
  end if;
 end if;
end loop;
```

What is claimed as new and desired to be secured by Letters Patent of the United States is:

1. A process of transferring blocks of data from a first bus to a second bus comprising the steps of:

detecting if a partial word from a first block of data has been stored in a register and if said blocks of data are being transferred in chain mode;

transferring said partial word from said register to said second bus prior to receiving a subsequent block of data from said first bus upon detecting that said partial word is stored in said register and that said blocks of data are being transferred in chain mode.

2. The process of claim 1, wherein the first bus is an external bus.

3. The process of claim 1, wherein the first bus is a SCSI bus.

4. The process of claim 1, wherein the second bus is a parallel bus.

5. The process of claim 1, wherein the second bus is an internal bus.

6. A process for transferring a block of data from a system memory to a bus comprising the steps of:

detecting if said block of data ends in a partial word;

detecting if said block of data is being transferred from said system memory in chain mode;

joining said partial word with a remainder of said partial word if said block of data is being transferred in chain mode;

transferring said partial word and said remainder to said bus;

joining said partial word with a dummy byte if said block of data is not being transferred in chain mode; and, transferring said partial word and said dummy byte to said bus.

7. A process of controlling the transfer of multiple byte words received from an external bus to a system bus comprising the steps of:

transferring said multiple byte words from said external bus to said system bus as long as said multiple bye words do not form a partial word;

detecting if at least one residue byte is present in said multiple byte words;

storing said at least one residue byte in a residue register;

setting a residue flag that indicates that a residue byte has been stored;

transferring said at least one residue byte from said residue register to said system bus prior to transferring subsequent multiple byte words; and resetting said residue flag.

8. The process of claim 7, wherein the external bus is a SCSI bus.

9. The process of claim 7, wherein the external bus is a parallel bus.

10. A process for transferring a block of data from a system memory to a bus comprising the steps of:

determining if said block of data ends in a partial word;

determining if said block of data is being transferred in chain mode;

transferring said partial word to said bus with a dummy byte when said block of data is being transferred in a mode other than chain mode;

storing said partial word when said block of data is being transferred in chain mode; and, transferring said partial word to said bus with a remainder of said partial word from a subsequent block of data when said block of data is being transferred in chain mode.

11. A device for controlling a transfer of data in a transmit mode from a system bus having a first predetermined byte width, to an external bus having a second predetermined byte width, and for controlling a transfer of data in a receive mode from said external bus to said system bus comprising:

a byte router that arranges said data in words having said first predetermined byte width during said receive mode, and having said second predetermined byte width during said transmit mode;

a processor that generates a first flag when a first residue byte is detected during said receive mode and a second flag when a second residue byte is detected during said transmit mode;

a control register that stores said first or second flags;

a first register that stores said first residue byte when said first flag is stored in said control register; and, a second register that stores said second residue byte when said second flag is stored in said control register.

* * * * *